(12) United States Patent
Yamada et al.

(10) Patent No.: US 12,228,834 B2
(45) Date of Patent: *Feb. 18, 2025

(54) LIGHT CONTROL DEVICE, MANAGEMENT METHOD FOR LIGHT CONTROL DEVICE, AND PRODUCTION METHOD FOR LIGHT CONTROL DEVICE

(71) Applicant: TOPPAN PRINTING CO., LTD., Tokyo (JP)

(72) Inventors: Takehiro Yamada, Taito-ku (JP); Yusuke Higashi, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 17/098,869

(22) Filed: Nov. 16, 2020

(65) Prior Publication Data

US 2021/0072572 A1 Mar. 11, 2021

Related U.S. Application Data

(63) Continuation of application No. PCT/JP2019/019266, filed on May 15, 2019.

(30) Foreign Application Priority Data

May 15, 2018 (JP) ................................. 2018-094150

(51) Int. Cl.
*G02F 1/137* (2006.01)
*E06B 9/24* (2006.01)
(Continued)

(52) U.S. Cl.
CPC ................ *G02F 1/137* (2013.01); *E06B 9/24* (2013.01); *G01N 1/28* (2013.01); *G01N 21/59* (2013.01);
(Continued)

(58) Field of Classification Search
CPC ....... G01N 21/59; G02F 1/137; G02F 1/1334; G02F 1/13306; G02F 1/13439;
(Continued)

(56) References Cited

U.S. PATENT DOCUMENTS 11,131,896 B2 * 9/2021 Hayashida .......... G02F 1/13439
11,640,078 B2 * 5/2023 Kaneko ............... G02F 1/13439
349/139

(Continued)

FOREIGN PATENT DOCUMENTS

EP 3 196 014 A1 7/2017
JP 2006103070 A * 4/2006
(Continued)

OTHER PUBLICATIONS

International Search Report issued Jul. 16, 2019 in PCT/JP2019/019266, filed May 15, 2019, citing documents AP therein (with English Translation).

(Continued)

*Primary Examiner* — Hoa Q Pham
(74) *Attorney, Agent, or Firm* — Oblon, McClelland, Maier & Neustadt, L.L.P.

(57) ABSTRACT

A light control device including a light control sheet including a light control layer switchable between at least a first state and a second state by changing alignment of liquid crystal molecules by application of a drive voltage, and transparent electrode layers sandwiching the light control layer. The light control layer is transparent in the first state and turbid in the second state. The light control layer is in the second state when there is no application of the drive voltage. When the light control layer is in the second state, the light control sheet has a transmitted image definition of (Continued)

70% or less, where the transmitted image definition is based on JIS K 7374:2007 with an optical comb width set to 0.125 mm.

20 Claims, 4 Drawing Sheets

(51) Int. Cl.
  *G01N 1/28* (2006.01)
  *G01N 21/59* (2006.01)
  *G02F 1/13* (2006.01)
  *G02F 1/1343* (2006.01)

(52) U.S. Cl.
  CPC ........ *G02F 1/1309* (2013.01); *G02F 1/13439* (2013.01); *E06B 2009/2417* (2013.01); *E06B 2009/2464* (2013.01)

(58) Field of Classification Search
  CPC .. G02F 1/13476; G02F 1/1309; G06F 3/0445; E06B 2009/2464
  USPC ................................ 349/195, 21, 33; 345/87
  See application file for complete search history.

(56) References Cited

U.S. PATENT DOCUMENTS

| | | | | |
|---|---|---|---|---|
| 11,686,965 | B2* | 6/2023 | Yasuhara | G02F 1/13306 |
| | | | | 349/86 |
| 2003/0016905 | A1* | 1/2003 | Kondoh | G02F 1/315 |
| | | | | 349/196 |
| 2009/0316254 | A1* | 12/2009 | Higashida | G02F 1/172 |
| | | | | 359/296 |
| 2015/0301237 | A1 | 10/2015 | Hayashi et al. | |
| 2017/0090237 | A1* | 3/2017 | Kim | G02F 1/13471 |
| 2017/0208752 | A1 | 7/2017 | Lohre et al. | |

FOREIGN PATENT DOCUMENTS

| | | | |
|---|---|---|---|
| JP | 2015-184471 | A | 10/2015 |
| JP | 2015-215420 | A | 12/2015 |
| JP | 2017-223950 | A | 12/2017 |
| JP | 2018-031870 | A | 3/2018 |
| KP | 4-1 46415 | A | 5/1992 |
| WO | WO 2010/100807 | A1 | 9/2010 |
| WO | WO 2017061493 | A1 * | 4/2017 |
| WO | WO 2017/217430 | A1 | 12/2017 |
| WO | WO 2018/066555 | A1 | 4/2018 |

OTHER PUBLICATIONS

Combined Chinese Office Action and Search Report issued May 30, 2023, in corresponding Chinese Patent Application No. 201980032139.5 (with English Translation and English Translation of Category of Cited Documents) citing document 15 therein, 19 pages.

Extended European Search Report issued on Jun. 11, 2021 in European Patent Application No. 19803438.1, citing documents AA and AO-AQ therein, 9 pages.

Japanese Office Action issued May 31, 2022 in Japanese Patent Application 2019-040159 (with unedited computer-generated English translation), citing references AO and AP therein, 6 pages.

Japanese Office Action issued on Nov. 22, 2022 in Japanese Patent Application No. 2019-040159 (with English translation), citing reference 15 therein, 10 pages.

* cited by examiner

LIGHT CONTROL DEVICE, MANAGEMENT METHOD FOR LIGHT CONTROL DEVICE, AND PRODUCTION METHOD FOR LIGHT CONTROL DEVICE

CROSS-REFERENCE TO RELATED APPLICATIONS

The present application is a continuation of International Application No. PCT/JP2019/019266, filed May 15, 2019, which is based upon and claims the benefits of priority to Japanese Application No. 2018-094150, filed May 15, 2018. The entire contents of all of the above applications are incorporated herein by reference.

BACKGROUND OF THE INVENTION

Field of the Invention

The present invention relates to a light control device, a management method for a light control device, and a production method for a light control device.

Discussion of the Background

Light control devices include a light control layer, two transparent electrodes sandwiching the light control layer in the thickness direction of the light control layer, and a drive circuit applying a voltage between the two transparent electrodes. The light control layer contains a polymer network containing multiple domains, and a liquid crystal composition containing liquid crystal molecules and filled in the polymer network. The light control layer is switched between a transparent state and a turbid state depending on whether a drive voltage for driving the liquid crystal molecules is applied to the light control layer. By switching the light control layer between transparent and turbid states, a light control device changes visibility of an image in two spaces sandwiching the light control layer, as seen from one space toward the other. Specifically, visibility of an object that is present in a first space relative to a light control layer, as seen from a second space therefor depends on whether the light control layer is in a transparent state or in a turbid state. The turbid state of a light control layer refers to a state in which light is scattered in the light control layer. Accordingly, the turbid state is evaluated using values of haze (JIS K 7136:2000) of the light control layer. Haze is an index of light scattering (e.g., see JP 2018-31870 A).

SUMMARY OF THE INVENTION

According to an aspect of the present invention, a light control device includes a light control sheet including a light control layer switchable between at least a first state and a second state by changing alignment of liquid crystal molecules by application of a drive voltage, and transparent electrode layers sandwiching the light control layer. The light control layer is transparent in the first state and turbid in the second state. The light control layer is in the second state when there is no application of the drive voltage. When the light control layer is in the second state, the light control sheet has a transmitted image definition of 70% or less, where the transmitted image definition is based on JIS K 7374:2007 with an optical comb width set to 0.125 mm.

According to another aspect of the present invention, a light control device includes a light control sheet including a light control layer switchable between at least a first state and a second state by changing alignment of liquid crystal molecules by application of a drive voltage, alignment layers sandwiching the light control layer, and transparent electrode layers sandwiching the alignment layers, and a drive circuit that switches a state thereof between a drive-voltage-application state and a drive-voltage-absent state. The light control layer is transparent in the first state and turbid in the second state. The light control layer is in the second state when the drive voltage is applied. When the light control layer is turned into the second state, the drive circuit applies the drive voltage between the transparent electrode layers such that the light control sheet has a transmitted image definition of 70% or less, where the transmitted image definition is based on JIS K 7374:2007 with an optical comb width set to 0.125 mm.

According to still another aspect of the present invention, a light control device includes a light control sheet including a light control layer switchable between at least a first state and a second state by changing alignment of liquid crystal molecules by application of a drive voltage, and transparent electrode layers sandwiching the light control layer. The light control layer is transparent in the first state and turbid in the second state. The light control layer is in the second state when there is no application of the drive voltage. The light control sheet has a clarity of 89.1% or less when the light control layer is in the second state, and the clarity is calculated by Formula (1):

$$100 \times (I_C - I_R)/(I_C + I_R) \qquad (1)$$

where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

According to yet another aspect of the present invention, a light control device includes a light control sheet including a light control layer switchable between at least a first state and a second state by changing alignment of liquid crystal molecules by application of a drive voltage, alignment layers sandwiching the light control layers, and transparent electrode layers sandwiching the alignment layers, and a drive circuit that switches a state thereof between a drive-voltage-application state and a drive-voltage-absent state. The light control layer is transparent in the first state and turbid in the second state. The light control layer is in the second state when the drive voltage is applied. When the light control layer is turned into the second state, the drive circuit applies the drive voltage between the transparent electrode layers such that the light control sheet has a clarity of 89.1% or less, and the clarity is calculated by Formula (1):

$$100 \times (I_C - I_R)/(I_C + I_R) \qquad (1)$$

where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

According to yet another aspect of the present invention, a testing method includes conducting a test on a light control device including a light control sheet which includes a light control layer switchable between at least a first state and a second state by changing alignment of liquid crystal molecules by application of a drive voltage, and a plurality of transparent electrode layers sandwiching the light control layer which is transparent in the first state and turbid in the second state. The test includes determination of whether the light control sheet has a transmitted image definition of 70% or less when the light control layer is in the second state, where the transmitted image definition is based on JIS K 7374:2007 with an optical comb width set to 0.125 mm.

According to yet another aspect of the present invention, a testing method includes conducting a test on a light control device including a light control sheet which includes a light control layer switchable between at least a first state and a second state by changing alignment of liquid crystal molecules by application of a drive voltage, and a plurality of transparent electrode layers sandwiching the light control layer which is transparent in the first state and turbid in the second state. The test includes determination of whether the light control sheet has a clarity of 89.1% or less when the light control layer is in the second state, where the clarity is calculated by Formula (1):

$$100 \times (I_C - I_R)/(I_C + I_R) \quad (1)$$

where $I_C$ is an intensity of straight light along an optical axis of parallel light entering the light control sheet in light passing through the light control sheet, and $I_R$ is an intensity of narrow-angle scattering light having an angle within ±2.5° relative to the optical axis of the parallel light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
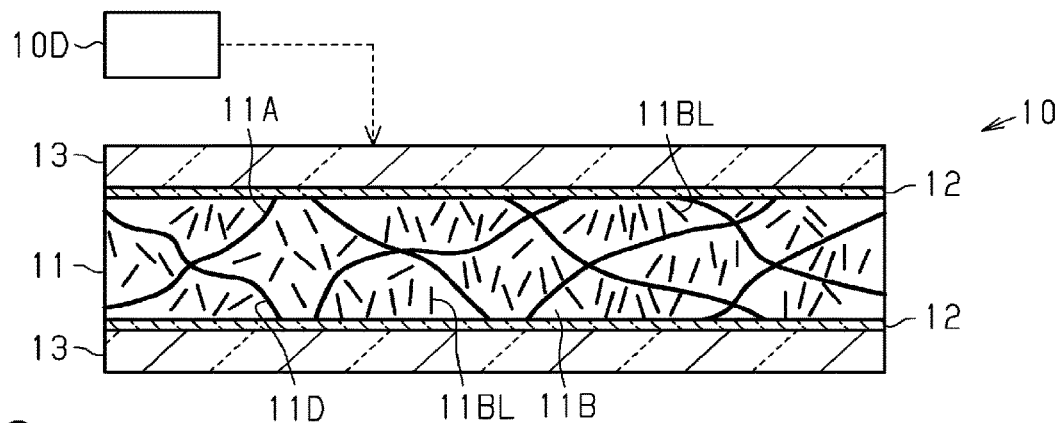
FIG. 1 is a cross-sectional view illustrating a state in which no drive voltage is applied to a light control layer, according to a first mode of a light control device.

The embodiments will now be described with reference to the accompanying drawings, wherein like reference numerals designate corresponding or identical elements throughout the various drawings.

Referring to FIGS. 1 to 9, an embodiment of a light control device, a management method for a light control device, and a production method for a light control device will be described. In the following description, a configuration of a light control device, a measurement method for transmitted image definition, a measurement method for clarity, a management method for the light control device, and examples will be explained in this order. In the present embodiment, objects that are present behind a light control sheet, i.e., objects whose secrecy is desired to be kept, are collectively referred to as subjects. Examples of the subjects may include persons, devices and stationary objects. The subjects are objects that can be visually recognized via a light control sheet.

(Configuration of Light Control Device)

Referring to FIGS. 1 to 4, a configuration of a light control device will be described.

The light control device according to the present embodiment includes a first mode and a second mode as described below.

(First Mode)

Figure 2:
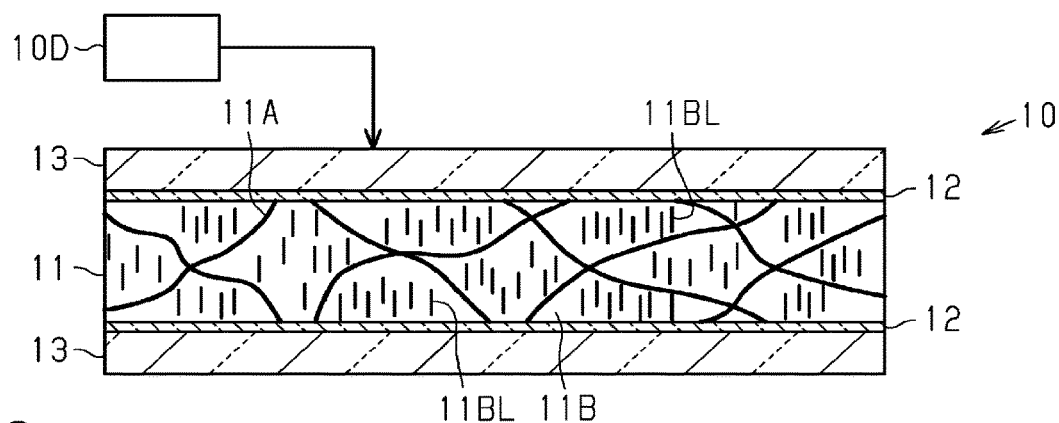
FIG. 2 is a cross-sectional view illustrating a state in which a drive voltage is applied to the light control layer, according to the first mode of the light control device.

Referring to FIGS. 1 and 2, a light control device of a first mode will be described.

FIG. 1 shows a state in which no drive voltage is applied to a light control device of a first mode. The drive voltage is a voltage for switching the alignment of liquid crystal molecules contained in a light control layer. FIG. 2 shows a state in which a drive voltage is applied to the light control device of the first mode.

FIG. 1 shows a light control device 10 including a light control sheet. The light control sheet includes a light control layer 11 and two transparent electrodes 12. The light control layer 11 includes a polymer network 11A and a liquid crystal composition 11B. The polymer network 11A contains multiple domains 11D. The domains 11D are voids defined in the polymer network 11A. The voids may be spaces isolated from each other by the polymer network 11A or may be spaces communicating with each other. The liquid crystal composition 11B contains liquid crystal molecules 11BL and is filled in the domains 11D.

The two transparent electrode layers 12 sandwich the light control layer 11 in the thickness direction of the light control layer 11. The transparent electrode layers 12 are transparent to light in the visible light range. Materials for forming the transparent electrode layers 12 may include, for example, transparent electrically conductive oxides (TCO) and electrically conductive polymers.

The light control device 10 also includes two transparent substrates 13. The two transparent substrates 13 sandwich the two transparent electrode layers 12 in the thickness direction of the light control layer 11. The transparent substrates 13 are transparent to light in the visible light range. Materials for forming the transparent substrates 13 may include, for example, glass and synthetic resins.

The light control layer 11 is switched between at least a first state that is a transparent state and a second state that is a turbid state. The first and second states of the light control layer 11 are switched according to the alignment of the liquid crystal molecules 11BL. The alignment is changed in response to the application of a drive voltage for driving the liquid crystal molecules 11BL. The light control layer 11 is in the second state when no drive voltage is applied thereto.

As mentioned above, no drive voltage is being applied between the two transparent electrode layers 12 in the light control device 10 shown in FIG. 1. In this case, the liquid crystal molecules 11BL in the domains 11D are randomly oriented. Accordingly, the light that is incident on either of the two transparent substrates 13 and enters the light control device 10 is isotropically scattered in the light control layer 11. Therefore, the light control layer 11 is in a turbid state, i.e., in the second state. The second state is a state in which the light control layer 11 has highest opacity. The light control layer 11 in the second state may be turbid white, or may be in a colored state due to addition of a pigment having a predetermined color to the turbid white light control layer 11, i.e., may be turbid and colored. When the light control layer 11 contains a pigment, the liquid crystal composition 11B contains a dichroic pigment. In other words, the light control layer 11 is a guest-host type light control layer.

When the light control layer 11 is in the second state, the transmitted image definition of the light control sheet according to JIS K 7374:2007 is 70% or less. The transmitted image definition is one obtained with the optical comb width set to 0.125 mm. Accordingly, the turbid state of the light control layer 11 corresponds to the light control sheet having a transmitted image definition of 70% or less. Therefore, visibility of a subject behind the light control sheet can be lowered in the light control layer 11 in a turbid state. When the light control layer 11 is in the second state, the transmitted image definition of the light control sheet is preferred to be 60.5% or less. When the light control layer 11 is in the second state, visibility of a subject behind the light control sheet can be lowered even more.

When the light control layer 11 is in the second state, the light control sheet has a clarity of 89.1% or less. This can exert an effect equivalent to the case where the light control sheet has a transmitted image definition of 70% or less. When the light control layer 11 is in the second state, the clarity of the light control sheet is preferred to be 82.9% or less. This can exert an effect equivalent to the case where the light control sheet has a transmitted image definition of 60.5% or less. In the light control sheet, either of the transmitted image definition and the clarity may be in the above preferred range of the parameter, or both of them may be in the above preferred ranges of these parameters.

When the light control layer 11 is in the second state, the light control sheet is preferred to have a haze of 95% or more according to JIS K 7136:2000. This may reduce the contrast between a subject and the surrounding thereof observed via the light control sheet, in addition to reducing the sharpness of the contour of the subject. Therefore, when the light control layer 11 is in the second state, the light control device 10 can exert high concealing performance for the subject.

As shown in FIG. 2, when a drive voltage is applied to the light control layer 11 by a drive circuit 10D, the orientation of the liquid crystal molecules 11BL that was previously random is changed, for example, to a vertical alignment allowing light to be transmitted therethrough. In other words, the liquid crystal molecules 11BL are positioned in the domains 11D so that the long axes of the liquid crystal molecules 11BL will be substantially perpendicular to the plane in which the light control layer 11 is provided. Accordingly, the light that is incident on either of the two transparent substrates 13 and enters the light control sheet passes through the light control layer 11 without substantially being scattered therein. Therefore, the light control layer 11 is in a transparent state, i.e., in the first state.

(Second Mode)

Figure 3:
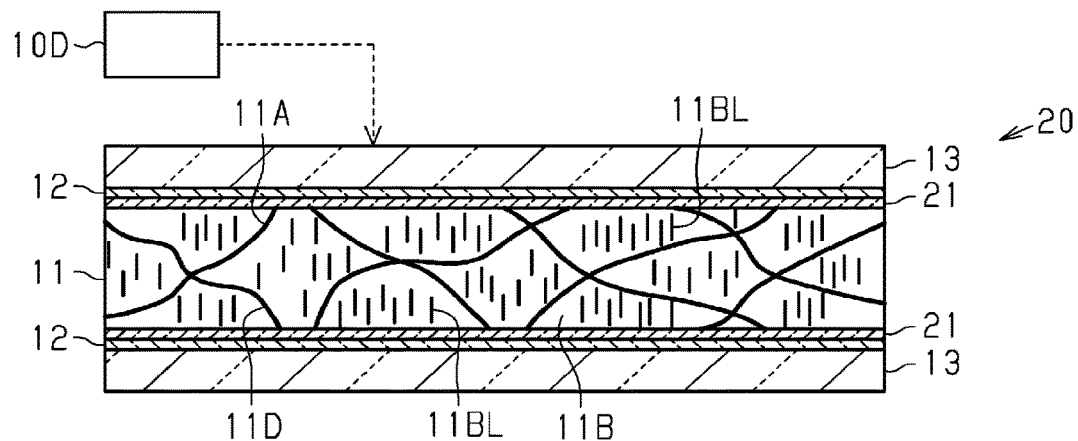
FIG. 3 is a cross-sectional view illustrating a state in which no drive voltage is applied to a light control layer, according to a second mode of a light control device.
Figure 4:
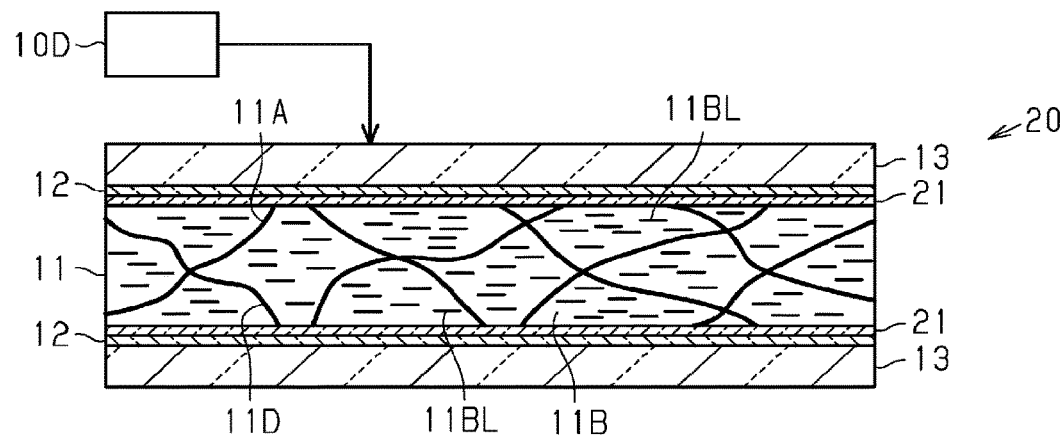
FIG. 4 is a cross-sectional view illustrating a state in which a drive voltage is applied to the light control layer, according to the second mode of the light control device.

Referring to FIGS. 3 and 4, a light control device of a second mode will be described.

FIG. 3 shows a state in which no drive voltage is applied to the light control device of the second mode. FIG. 4 shows a state in which a drive voltage is applied to the light control device of the second mode.

FIG. 3 shows a light control device 20 including a light control sheet which includes two alignment layers 21, in addition to a light control layer 11, two transparent electrodes 12, and two transparent substrates 13. The two alignment layers 21 sandwich the light control layer 11 in the thickness direction of the light control layer 11, and are positioned closer to the center portion than are the two transparent electrode layers 12 in the thickness direction of the light control layer 11. In other words, one alignment layer 21 is positioned between the light control layer 11 and one transparent electrode layer 12, and the other alignment layer 21 is positioned between the light control layer 11 and the other transparent electrode layer 12.

If the alignment layers 21 are vertical alignment layers, the liquid crystal molecules 11BL in the domains 11D are vertically aligned in the state in which no drive voltage is applied. In other words, the liquid crystal molecules 11BL are positioned in the domains 11D so that the long axes of the liquid crystal molecules 11BL will be substantially perpendicular to the plane in which the light control layer 11 is provided. Accordingly, the light that is incident on either of the two transparent substrates 13 and enters the light control sheet passes through the light control layer 11 without substantially being scattered therein. Therefore, the light control layer 11 is in a transparent state, i.e., in the first state.

As shown in FIG. 4, while a drive voltage is applied to the light control layer 11, the alignment of the liquid crystal molecules 11BL is changed. For example, the alignment of the liquid crystal molecules 11BL changes from a vertical alignment to a horizontal alignment. In this case, the liquid crystal molecules 11BL are positioned in the domains 11D so that the long axes of the liquid crystal molecules 11BL will be extended parallel to the plane in which the light control layer 11 is provided. Accordingly, the light that is incident on either of the two transparent substrates 13 and enters the light control sheet is scattered in the light control layer 11. Therefore, the light control layer 11 is in a turbid state, i.e., in the second state.

Such a light control sheet also, as in the light control sheet described above, has a transmitted image definition of 70% or less according to JIS K 7374:2007 when the optical comb width is set to 0.125 mm and the light control layer 11 is in the second state. When the light control layer 11 is in the second state, the transmitted image definition of the light control sheet is preferred to be 60.5% or less. In other words, when bringing the light control layer 11 into the second state, the drive circuit 10D applies a drive voltage between the transparent electrode layers 12 so that the light control sheet will have a transmitted image definition of 70% or less.

When the light control layer 11 is in the second state, the light control sheet is preferred to have a clarity of 89.1% or less, and more preferably 82.9% or less. In other words, when bringing the light control layer 11 into the second state, the drive circuit 10D applies a drive voltage between the transparent electrode layers 12 so that the light control sheet will have a clarity of 89.1% or less. In this light control sheet also, either of the transmitted image definition and the clarity may be in the above preferred range of the parameter, or both of them may be in the above preferred ranges of these parameters. When the light control layer 11 is in the second state, the light control sheet is preferred to have a haze of 95% or more according to JIS K 7136:2000.

As the size of the domains in the light control layer 11 is reduced, and as the density of the domains, i.e., the number of domains per unit volume, in the light control layer 11 is increased, the transmitted image definition of the light control sheet is accordingly lowered. Thus, a configuration for allowing the light control sheet to have a transmitted image definition of 70% or less can be achieved, for example, by forming the polymer network 11A such that the size of the domains in the light control layer 11 is reduced and the density of the domains in the light control layer 11 is increased. The relationship of the size and density of the domains with the transmitted image definition of the light control sheet applies to the relationship of the size and density of the domains with the clarity of the light control sheet.

(Method of Measuring Transmitted Image Definition)

Figure 5:
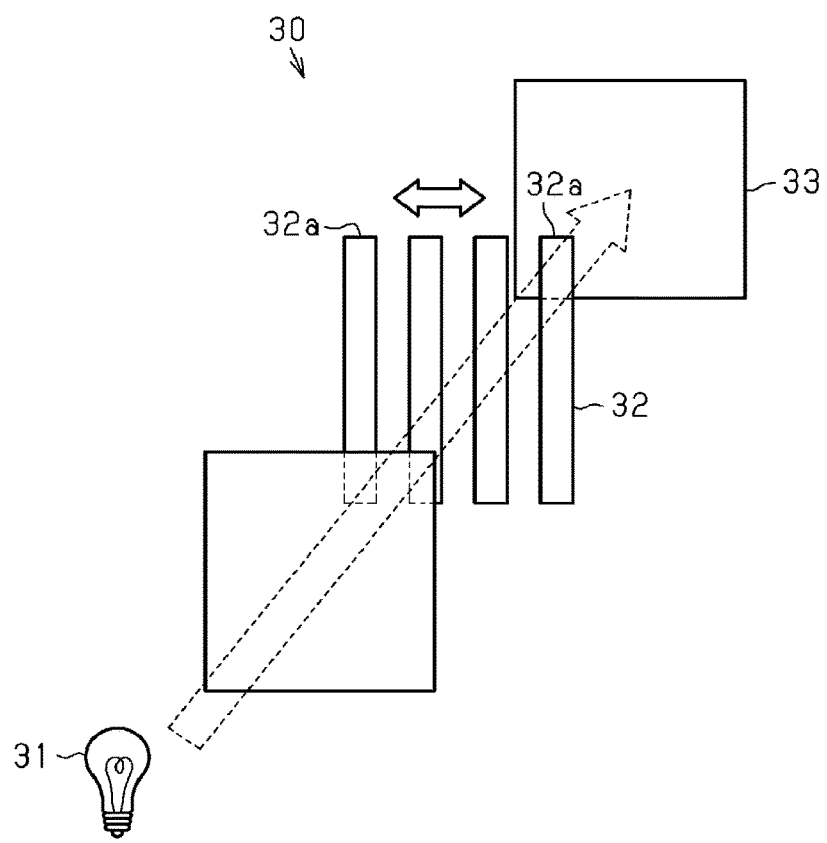
FIG. 5 is a schematic diagram illustrating a configuration of a measurement device for transmitted image definition, together with a light control device as an object to be measured.
Figure 6:
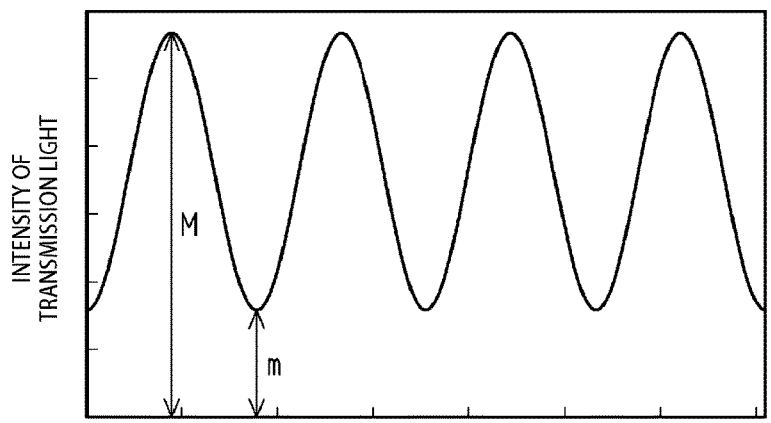
FIG. 6 is a graph showing intensity of light received by the measurement device for transmitted image definition.

Referring to FIGS. 5 and 6, a method of measuring a transmitted image definition will be described. As mentioned above, the transmitted image definition of the present embodiment is measured by a method according to JIS K 7374:2000. In the following description, a method of measuring a transmitted image definition will be explained together with an example of a measurement device used for measuring the transmitted image definition.

FIG. 5 shows a measurement device 30 for measuring transmitted image definition, which includes a light source 31, an optical comb 32, and a light-receiving part 33. In the measurement device 30, a light control sheet, i.e., an object to be measured, is placed between the light source 31 and the optical comb 32. When measuring a transmitted image definition, the optical comb 32 is permitted to move at a constant speed parallel with a plane which is perpendicular to the direction in which the light source 31, the light control sheet and the optical comb 32 are arranged. The optical comb 32 includes shields 32a for shielding light, each having a width in the moving direction of the optical comb 32 which is defined to be an optical comb width. In the optical comb 32, the width of each shield 32a is equal to the width of each slit in the direction in which the optical comb 32 moves. In the present embodiment, the optical comb width is 0.125 mm.

As shown in FIG. 6, the intensity of light passing through the optical comb 32, i.e., the intensity of light received by the light-receiving part 33, periodically changes. The maximum intensity of light received by the light-receiving part 33 is defined to be a maximum light intensity M, and similarly a minimum intensity of light is defined to be a minimum light intensity m. The maximum light intensity M is obtained when the light that has passed through the light control sheet is not shielded by the optical comb 32. The minimum light intensity m is obtained when the light that has passed through the light control sheet is shielded by the optical comb 32.

A transmitted image definition C(n) (%) when the optical comb width is n can be calculated from the following Formula (2) by using the maximum light intensity M and the minimum light intensity m.

$$C(n) = 100 \times (M-m)/(M+m)$$ Formula (2)

The transmitted image definition of the light control sheet can be measured by using the measurement method described above, for both the cases where the light control layer 11 contains a pigment and does not contain a pigment.

(Method of Measuring Clarity)

Figure 7:
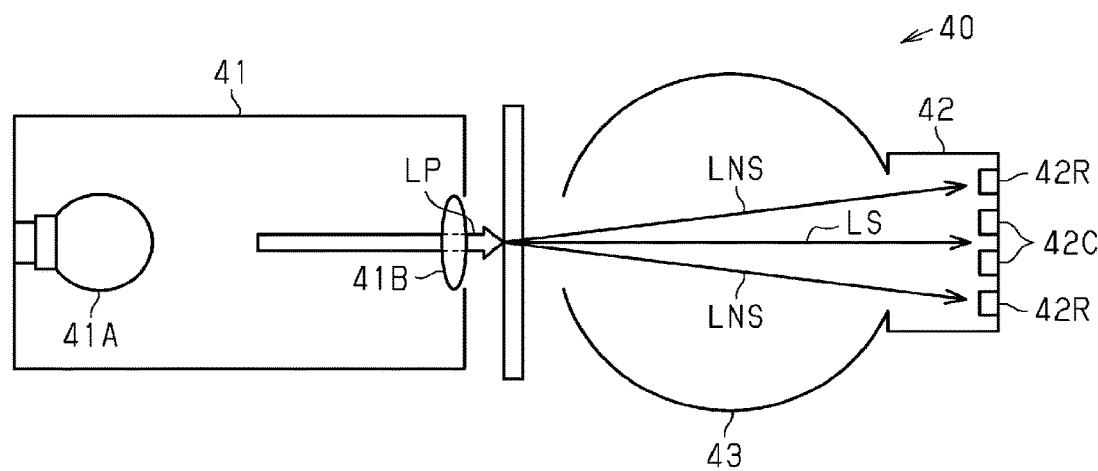
FIG. 7 is a schematic diagram illustrating a configuration of a measurement device for clarity, together with a light control device as an object to be measured.

Referring to FIG. 7, a method of measuring a clarity will be described. FIG. 7 schematically shows an example of a measurement device used for measuring clarity.

FIG. 7 shows a measurement device 40 used for measuring clarity, which includes an illumination part 41, a light-receiving part 42, and an integrating sphere 43. The illumination part 41 includes a light source 41A and a lens 41B. The light source 41A is a white LED, and the lens 41B converts the light emitted from the light source 41A into parallel light. The light-receiving part 42 includes a center sensor 42C and an outer peripheral sensor 42R. The center sensor 42C and the outer peripheral sensor 42R are annularly shaped. The outer peripheral sensor 42R is positioned outside the center sensor 42C. The measurement device 40 can be used for measuring not only clarity but also haze of an object to be measured. The integrating sphere 43 of the measurement device 40 is used only for measuring haze.

In the measurement device 40, a light control sheet is placed between the illumination part 41 and the integrating sphere 43. The flux of parallel light emitted from the lens 41B has a diameter of 14 mm in the present embodiment. The light that has passed through the light control sheet includes straight light LS and narrow-angle scattered light LNS. The straight light LS propagates straight along the optical axis of the parallel light LP that has entered the light control layer 11. The narrow-angle scattered light LNS has an angle within ±2.5° relative to the optical axis of the parallel light LP. In the light-receiving part 42, the center sensor 42C receives the straight light LS, and the outer peripheral sensor 42R receives the narrow-angle scattered light LNS. The intensity of the straight light LS received by the center sensor 42C is defined to be $I_C$, and the intensity of the narrow-angle scattered light LNS received by the outer peripheral sensor 42R is defined to be $I_R$.

A clarity is calculated from the following Formula (1), where $I_C$ is the intensity of the straight light LS propagating straight along the optical axis of the parallel light LP that has entered the light control layer 11, and $I_R$ is the intensity of the narrow-angle scattered light LNS having an angle within ±2.5° relative to the optical axis of the parallel light LP.

$$100 \times (I_C - I_R)/(I_C + I_R)$$ Formula (1)

The clarity of the light control sheet can be measured by using the measurement method described above, for both the cases where the light control layer 11 contains a pigment and does not contain a pigment.

As mentioned above, the haze of the light control sheet can be measured by using the measurement device 40. The haze is measured using a method according to JIS K 7136:2000. When measuring a haze using the measurement device 40, the light that has passed through the light control sheet is received by the light-receiving part disposed in the integrating sphere 43.

The term haze refers to a percentage of transmitted light that has passed through the object to be measured and has deviated from the incident light by 2.5° or more due to forward scattering. In other words, in haze measurements, parallel light refers to light having an angle of less than ±2.5° relative to the optical axis of the parallel light LP, and wide-angle scattered light refers to the light having an angle of ±2.5° or more relative to the same. The transmittance of the wide-angle scattered light is defined to be a scattered transmittance $T_d$, the transmittance of the parallel light is defined to be a parallel transmittance $T_p$, the sum of the parallel transmittance $T_p$ and the scattered transmittance $T_d$ is defined to be a total light transmittance $T_t$. In this case, haze is the ratio of the scattered transmittance $T_d$ to the total light transmittance $T_t$.

As mentioned above, the clarity and haze of the light control sheet can be measured by using a single measurement device 40. However, clarity and haze are parameters quantifying the attributes which are completely different from each other in the light control sheet. Transmitted image definition is a parameter quantifying the attributes that are equivalent to the attributes quantified for clarity. Accordingly, transmitted image definition and haze are parameters quantifying the attributes which are completely different from each other in the light control sheet.

Specifically, haze is a parameter for evaluating the state of the light control sheet by using the wide-angle scattered light. Therefore, haze can be used for evaluating the degree of turbidity of the light control sheet as a whole, e.g., the degree of whiteness of the light control sheet as a whole, perceived by the observer by visually inspecting the light control sheet. Thus, when the observer visually recognizes a subject via the light control sheet, the contrast between the subject and the surrounding of the subject is lowered as the haze of the light control sheet increases, so that the subject looks blurred to the observer. Thus, haze is a parameter for evaluating the degree of turbidity of the light control sheet.

In contrast, clarity is a parameter for evaluating the state of the light control sheet by using the narrow-angle scattered light. Therefore, clarity can be used for evaluating the degree of sharpness of very small portions of a subject in an image of the subject via the light control sheet. Thus, when the observer visually recognizes a subject via the light control sheet, the contour of the subject via the light control sheet, in other words, the sharpness of the subject, is lowered as the value of clarity of the light control sheet decreases. In this way, clarity is used for evaluating the sharpness of an image of a subject observed via the light control sheet, i.e., used for evaluating the attributes that are completely different from haze. In other words, clarity can be used for evaluating the attributes of the light control sheet which cannot be evaluated by haze.

As described above, haze is a parameter for evaluating the degree of turbidity of the light control sheet as a whole. Therefore, if the opacity of a light control sheet is evaluated in terms of haze, the subject visually recognized via the light control sheet can have a sharp contour, although the degree of turbidity of the light control sheet may be sufficient. Specifically, the light control sheets evaluated in terms of haze may include those light control sheets having insufficient capability of blurring the contour of the subjects visually recognized via these sheets. More specifically, the light control sheets whose values of haze are substantially equivalent to each other can include those light control sheets whose values of clarity are different from each other. Such light control sheets have substantially the same degree of turbidity, but the subjects visually recognized via these light control sheets may have contours with different degrees of blurring. When the light control sheets are visually inspected by the observer, the difference in the degree of blurring of the contours may be perceived by the observer as a difference in the degree of opacity. As a result, there may be a discrepancy between the opacity evaluation based on the value of haze and the opacity evaluation based on visual inspection.

In this regard, if the opacity of a light control sheet is evaluated in terms of clarity, the contour of a subject observed via the light control sheet may be blurred more as the clarity decreases. Therefore, the discrepancy between the opacity evaluation based on clarity and the opacity evaluation based on visual inspection may be minimized.

Light control sheets may be applied to the window glass of vehicles or buildings. In this case, the light control sheets are required to have high privacy protection performance for subjects inside the vehicles or buildings by being brought into the second state, i.e., in the turbid state. Having high privacy protection means that the subjects inside the vehicles or buildings are difficult to identify, or that the light control sheets have high concealing performance to an extent that determining the presence of the subjects inside is difficult.

The opacity evaluation of light control sheets using clarity enables selection of light control sheets which are so turbid as to blur the contours of the subjects visually recognized via the light control sheets. Therefore, the degree of privacy protection performance can be measured according to the value of clarity. Consequently, a light control sheet having high privacy protection performance can be obtained.

If the clarity is in the range mentioned above, the opacity of the image of the subject visually recognized via the light control sheet is reliably ensured. Such a light control sheet is particularly preferred to be used for the case where the distance from the light control sheet to the subject is small, or the case where the illumination range of the light source illuminating the subject is narrow, or the case where the intensity of illumination applied to the subject is high.

As mentioned above, the opacity of light control sheets has been evaluated based on haze. However, under the circumstances where usage of light control sheets is diversified, opacity evaluation of light control sheets based on haze has been inappropriate in some cases irrespective of the applications, from the perspective of enhancing privacy protection performance for the subjects. Therefore, clarity has been offered as a new parameter to be satisfied by light control sheets. Furthermore, a preferred numerical range of clarity has been offered from the perspective of enhancing privacy protection performance. The light control sheet, and the light control device including the light control sheet of the present embodiment have been developed through these processes.

The opacity evaluation of a light control sheet using the transmitted image definition described above can achieve advantageous effects comparable to those achieved by the opacity evaluation of a light control sheet using clarity. Specifically, discrepancy can be minimized between the opacity evaluation based on transmitted image definition and the opacity evaluation based on visual inspection.

(Management Method for Light Control Device)

A management method for a light control device is used for a production method for a light control device or a control method for a light control device. Specifically, a production method for a light control device or a control method for a light control device can include a management method for a light control device. In the management method for a light control device, the light control layer 11 is determined as to whether it is functioning normally. Requirements for determining whether the light control layer 11 is functioning normally include the following Requirement 1 as an example. Requirements for determining whether the light control layer 11 is functioning normally include the following Requirement 2 as another example. Requirements for determining whether the light control layer 11 is functioning normally include both of the following Requirements 1 and 2 as still another example.

(Requirement 1) When the light control layer 11 is in the second state, the light control sheet has a transmitted image definition of 70% or less according to JIS K 7374:2007 with the optical comb width set to 0.125 mm.

(Requirement 2) When the light control layer 11 is in the second state, the light control sheet has a clarity of 89.1% or less. Clarity is calculated from Formula (1) mentioned above.

The management method for a light control device includes determining whether the light control layer 11 is functioning normally. Determining whether the light control layer 11 is functioning normally includes determining whether Requirement 1 is satisfied when the light control layer 11 is in the second state. Determining whether the light control layer 11 is functioning normally includes determining that the light control layer 11 is functioning normally when Requirement 1 is satisfied and the light control layer 11 is in the second state. Alternatively, determining whether the light control layer 11 is functioning normally includes determining whether Requirement 2 is satisfied when the light control layer 11 is in the second state. Furthermore, determining whether the light control layer 11 is functioning normally includes determining that the light control layer 11 is functioning normally when Requirement 2 is satisfied and the light control layer 11 is in the second state. Alternatively, determining whether the light control layer 11 is functioning normally includes determining whether both of Requirements 1 and 2 are satisfied when the light control layer 11 is in the second state. Furthermore, determining whether the light control layer 11 is functioning normally includes determining that the light control layer 11 is functioning normally when both of Requirements 1 and 2 are satisfied and the light control layer 11 is in the second state.

When the management method for a light control device is applied to a production method for a light control device, the production method includes measuring a transmitted image definition of a light control sheet, and determining a light control sheet, in which the transmitted image definition satisfies Requirement 1, as being functioning normally. When the management method for a light control device is applied to a production method for a light control device, the production method includes measuring a clarity of a light control sheet, and determining a light control sheet, in which the clarity satisfies Requirement 2, as being functioning normally.

When the management method for a light control device is applied to a control method for a light control device, the control method includes allowing a drive circuit to apply a predetermined drive voltage to the light control sheet so that the transmitted image definition of the light control sheet satisfies Requirement 1. Furthermore, when the management method for a light control device is applied to a control method for a light control device, the control method includes allowing the drive circuit to apply a predetermined drive voltage to the light control sheet so that the clarity of the light control sheet satisfies Requirement 2.

Through these production methods, the opacity of a light control sheet can also be evaluated based on the degree of blurring, i.e., obscuring, of the contour of a subject behind the light control sheet. Also, through these control methods, the light control device can also be driven such that the opacity of the light control sheet can achieve a sufficient degree of blurring, i.e., obscuring, in the contour of a subject behind the light control sheet. Thus, discrepancy from the opacity evaluation based on visual inspection can be minimized even more than in the case of evaluating or controlling the opacity of a light control sheet based on the degree of turbidity of the light control sheet.

EXAMPLES

Figure 8:
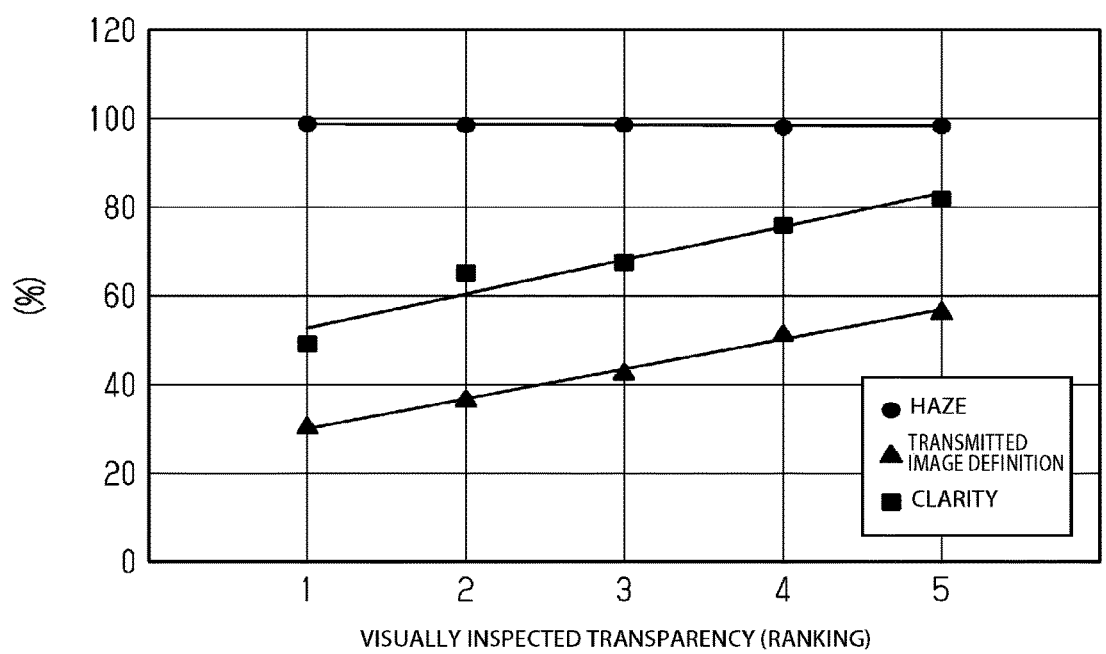
FIG. 8 is a graph showing haze, transmitted image definition, and clarity of light control devices according to examples.
Figure 9:
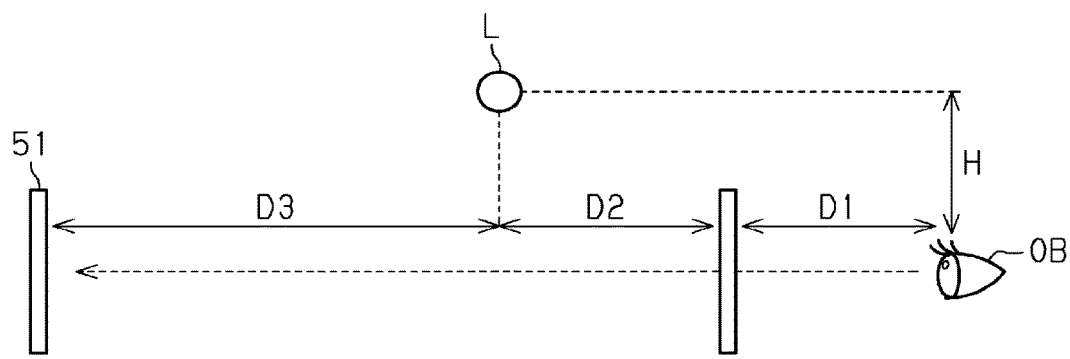
FIG. 9 is a schematic diagram illustrating an evaluation method when evaluating concealing performance of a light control device.

Referring to FIGS. 8 and 9, some examples will be described.
(Relationship Between Visual Inspection Evaluation and Parameters)

Five light control sheets were prepared, and transparency of these light control sheets in the second state was evaluated by visual inspection. Light control sheets of the first mode described above were prepared as the above light control sheets. When evaluating transparency by visual inspection, a fluorescent light with a light intensity of about 3,500 lm was placed at a position 80 cm from the rear surface of each light control sheet in the second state, and the light control sheet was visually inspected at a position 20 cm from the front surface of the light control sheet. The observer's eye, the light control sheet and the fluorescent light were arranged in alignment. In this state, the light control sheets were ranked by visual inspection from low to high order in fluorescent light visibility, or in other words, from difficult-to-see to easy-to-see the object order.

Each light control sheet in the second state was measured in terms of clarity, transmitted image definition, and haze. Transmitted image definition was measured by using an image clarity measurement device (ICM-1T manufactured by Suga Test Instruments Co., Ltd.) using a method according to JIS K 7374:2007. Haze was measured by using a haze meter (NDH7000SD manufactured by Nippon Denshoku Industries Co., Ltd.) using a method according to JIS K 7136:2000. Clarity was measured by using a haze/transparency measurement device (haze gard i manufactured by BYK-Gardner Gmbh).

FIG. 8 shows the above visual inspection ranking, together with the measurements of clarity, transmitted image definition, and haze.

As shown in FIG. 8, the light control sheets in descending order of the visual inspection ranking respectively had clarity of 49.0%, 64.6%, 66.8%, 75.8% and 81.7%. Also, the light control sheets in descending order of the visual inspection ranking respectively had transmitted image definition of 30.4%, 36.5%, 42.6%, 51.5% and 56.2%. Thus, the light control sheets had lower clarity and transmitted image definition as they were ranked higher by visual inspection. Specifically, clarity and transmitted image definition were confirmed to be parameters which highly accurately showed the degree of transparency visually perceived by the observer, or in other words, the degree of opacity. In other words, the measured clarity and transmitted image definition were confirmed to be parameters which were highly correlated to the degree of transparency visually perceived by the observer.

In contrast, the light control sheets in descending order of the visual inspection ranking respectively had haze of 98.5%, 98.2%, 98.5%, 97.9% and 98.1%. Thus, haze of the light control sheets was confirmed to have lower correlation with the visual inspection ranking, compared to clarity and transmitted image definition. Specifically, haze was confirmed to be a parameter which was likely to cause discrepancy from the transparency, i.e., opacity, visually perceived by the observer.
(Concealing Performance of Light Control Sheet)

Light control sheets of Examples 1 to 10 were prepared and concealing performance of these sheets was evaluated through the method shown in FIG. 9. It should be noted that light control sheets of the first mode were prepared as the light control sheets of Examples 1 to 10.

The light control sheets of Examples 1 to 10 were measured in terms of clarity, transmitted image definition, and haze. The clarity, transmitted image definition, and haze were measured under the same conditions as when these parameters were measured for the above five light control sheets. Table 1 below shows measurements of clarity, transmitted image definition, and haze for the individual light control sheets.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Clarity | 55.9 | 72.7 | 76.9 | 78.0 | 80.8 | 82.9 | 87.3 | 89.1 | 89.5 | 94.9 |
| Transmitted image definition | 35.4 | 50.6 | 57.2 | 60.0 | 62.1 | 60.5 | 69.0 | 70.0 | 72.2 | 74.9 |
| Haze | 98.4 | 97.9 | 97.5 | 97.5 | 97.1 | 96.7 | 95.6 | 95.0 | 94.8 | 91.2 |

As shown in FIG. 9, a difference in height between a light source L and an observer OB was defined to be a height H. The distance between the front surface of the light control sheet and the observer OB was defined to be a first distance D1, the distance between the rear surface of the light control sheet and the light source L was defined to be a second distance D2, and the distance between the light source L and an inspection target 51 was defined to be a distance D3. The height H was set to 150 cm, the first and second distances D1 and D2 were both set to 50 cm, and the third distance D3 was set to 100 cm. In this case, a fluorescent light with an intensity of about 3,500 lm was used as the light source L. The inspection target 51 used had a checkerboard pattern in which white and black squares were alternated horizontally and vertically (Byko-charts manufactured by BYK-Gardner Gmbh). In each square, the length of one side was 31 mm.

15 testers evaluated the light control sheets of Examples 1 to 10 as to whether the checkerboard pattern could be visually recognized via the individual light control sheets. In the inspection of the inspection target 51 via the light control sheets, if the boundaries between the white and black squares were unclear, the light control sheets were evaluated to be good, and if the boundaries therebetween were clear, the light control sheets were evaluated to be poor. Table 2 below shows the evaluations.

TABLE 2

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Tester A | Good | Good | Good | Good | Good | Good | Poor | Poor | Poor | Poor |
| Tester B | Good | Good | Good | Good | Good | Good | Poor | Poor | Poor | Poor |
| Tester C | Good | Good | Good | Good | Good | Poor | Poor | Poor | Poor | Poor |
| Tester D | Good | Good | Good | Good | Good | Good | Poor | Poor | Poor | Poor |
| Tester E | Good | Good | Poor | Poor | Poor | Poor | Poor | Poor | Poor | Poor |
| Tester F | Good | Good | Good | Good | Good | Good | Poor | Poor | Poor | Poor |
| Tester G | Good | Good | Good | Good | Good | Poor | Poor | Poor | Poor | Poor |
| Tester H | Good | Good | Good | Poor | Poor | Poor | Poor | Poor | Poor | Poor |
| Tester I | Good | Good | Good | Good | Good | Good | Poor | Poor | Poor | Poor |
| Tester J | Good | Good | Good | Good | Good | Good | Poor | Poor | Poor | Poor |
| Tester K | Good | Good | Good | Good | Good | Good | Poor | Poor | Poor | Poor |
| Tester L | Good | Good | Good | Good | Poor | Poor | Poor | Poor | Poor | Poor |
| Tester M | Good | Good | Good | Good | Good | Good | Poor | Poor | Poor | Poor |
| Tester N | Good | Good | Good | Good | Good | Good | Good | Good | Poor | Poor |
| Tester O | Good | Good | Good | Good | Good | Good | Good | Poor | Poor | Poor |

As shown in Table 2, one tester evaluated the light control sheet of Example 8 as having high concealing performance. Ten testers, i.e., two third of the testers, evaluated the light control sheet of Example 6 as having high concealing performance. All the testers evaluated the light control sheet of Example 2 as having high concealing performance.

From these results, it was found that light control sheets having high concealing performance had a clarity of 89.1% or less, preferably 82.9% or less, and more preferably 72.7% or less. Also, it was found that light control sheets having high concealing performance had a transmitted image definition of 70.0% or less, preferably 60.5% or less, and more preferably 50.6% or less.

If the light control sheets of the second mode are used as light control sheets, the second mode can be evaluated by applying a saturation voltage as a drive voltage of the liquid crystal molecules. The saturation voltage is at a level that is unlikely to change the alignment of the liquid crystal molecules with the increase of the voltage.

As described above, according to an embodiment of the light control device, the management method for the light control device, and the production method for the light control device, advantageous effects as enumerated below can be achieved.

(1) The opacity of the light control sheet can be evaluated based on the degree of blurring, i.e., obscuring, of the contour of a subject behind the light control sheet. Thus, discrepancy from the opacity evaluation based on visual inspection can be minimized even more than in the case of evaluating or controlling the opacity of a light control sheet based on the degree of turbidity of the light control sheet.

(2) When an observer OB observes the light control sheet in which the light control layer 11 is in the second state, the observer OB can have a higher probability of determining the light control sheet as being opaque.

(3) The contrast between a subject and the surrounding thereof observed via the light control sheet can be reduced, in addition to reducing the sharpness of the contour of the subject. Therefore, when the light control layer 11 is in the second state, the light control sheet can exert high concealing performance for the subject.

The embodiment described above may be modified and implemented as follows.

The light control device may further include a controller that controls the opacity of the light control sheet with multiple levels of gradation. In this case, the controller that controls driving of the light control device may include information, such as a table, for converting each different value of transmitted image definition into a drive voltage. Thus, the controller can apply a drive voltage to the drive circuit which is correlated to the transmitted image definition specified such as by an external operation device. Specifically, the controller may store a plurality of values of transmitted image definition correlated to values of drive voltage. Thus, the controller may calculate a drive voltage for the light control layer to have a transmitted image definition corresponding to the opacity of a predetermined gradation level, and then may apply a drive voltage of the calculated value to the light control layer, thereby controlling the opacity of the light control sheet with multiple levels of gradation.

Alternatively, the controller that controls driving of the light control device may include information, such as a table, for converting each different value of clarity into a drive voltage. Thus, the controller can apply a drive voltage to the drive circuit which is correlated to the clarity specified such as by an external operation device. Specifically, the controller may store a plurality of values of clarity correlated to values of drive voltage. Thus, the controller may calculate a drive voltage for the light control layer to have a clarity corresponding to the opacity of a predetermined gradation level, and then may apply a voltage of the calculated value to the light control layer, thereby controlling the opacity of the light control sheet with multiple levels of gradation.

According to the light control device including such controllers, the opacity of the light control sheet can be changed with multiple stages based on the visually inspected opacity. Therefore, the opacity as desired by the user of the light control device can be achieved by the light control device.

Each controller described above is not limited to a controller that performs all the processes to be executed by it based on software processing. For example, the controller may include a dedicated hardware circuit (e.g., application specific integrated circuit (ASIC)) that performs hardware processing for at least a part of the processing to be executed by the controller. Specifically, the controller may be configured as 1) one or more processors acting according to computer programs (software), 2) one or more dedicated hardware circuits for executing at least a part of various types of processing, or 3) circuitry including a combination of the processor(s) and the dedicated hardware circuit(s). The processor may include a CPU and a memory, such as a RAM and a ROM, and the memory may store program codes or instructions that are configured for the CPU to execute the processing. The memory, i.e., the computer readable medium, may include any available medium that is accessible from general-purpose or dedicated computers.

In the light control device 20 of the second mode, when a drive voltage lower than a saturation voltage is applied to the light control sheet, the transmitted image definition of the light control sheet may be 70% or less, or the clarity thereof may be 89.1% or less.

The light control sheet may include a color layer containing a pigment to present a predetermined color. When the light control layer 11 is in the first state in such a light control sheet, the light control sheet is translucent with a color presented by the color layer. In contrast, when the light control layer 11 is in the second state, the light control sheet has a color presented by the color layer and is in a turbid state.

The embodiment described above assumes a flat light control sheet. The light control sheet described above includes a resin film such as of PET as a substrate. Accordingly, the light control sheet can be flexible. In other words, the light control sheet exerts excellent adaptability to curved surface processing. In other words, the light control sheet can be shaped conforming to an object to be applied having a curved surface. For example, if the light control sheet is processed into a free-form surface, the light control sheet can satisfy the requirements described above even in a region having a maximum curvature. Therefore, the sharpness of the subject behind the light control sheet can be lowered, irrespective of the curvature of the light control sheet.

The present application addresses the following. When a light control layer is in a turbid state, the light control device prevents a subject, such as a person or an object, that is present in the first space from being visually recognized by a person who is present in the second space. Specifically, the true and fundamental functions of light control devices reside in privacy protection of a subject that is present in the first space from a person who is present in the second space.

Application of light control devices to various objects, including windows, doors or walls of buildings, or front door glass, rear door glass or sunroof glass of vehicles, is under consideration. When application targets are diversified like this, the range of illumination, for example, in a space defined by a light control layer is broadened and high-intensity illumination is provided in such a space. In this case, privacy protection of a subject that is present in the space may be difficult. Also, for example, the range of the distance between a light control layer and a subject is broadened. Therefore, even if the distance between the light control layer and the subject is short, privacy protection of the subject that is present in the space may be difficult. For this reason, for the light control devices as mentioned above, visibility of a subject behind the light control layer is desired to be lowered even more in the state where the light control layer is in a turbid state.

The present invention has an aspect to provide a light control device capable of lowering visibility of a subject behind a control layer which is in a turbid state, a management method for the light control device, and a production method for the light control device.

A light control device includes a light control sheet. The light control sheet includes a light control layer and two transparent electrode layers sandwiching the light control layer. The light control layer can be switched between at least a first state and a second state by changing the alignment of liquid crystal molecules by application of a drive voltage. The light control layer is transparent in the first state but is turbid in the second state. The light control layer is in the second state when there is no application of the drive voltage. When the light control layer is in the second state, the light control sheet has a transmitted image definition of 70% or less. The transmitted image definition is based on JIS K 7374:2007 with an optical comb width set to 0.125 mm.

A light control device for solving the above issues includes a light control sheet and a drive circuit. The light control sheet includes a light control layer that can be switched between at least a first state and a second state by changing the alignment of liquid crystal molecules by application of a drive voltage, two alignment layers sandwiching the light control layer, and two transparent electrode layers sandwiching the two alignment layers. The drive circuit switches a state thereof between a drive-voltage applied state and a drive-voltage-absent state. The light control layer is transparent in the first state but is turbid in the second state. The light control layer is in the second state when the drive voltage is being applied. When bringing the light control layer into the second state, the drive circuit applies the drive voltage between the transparent electrode layers so that the light control sheet has a transmitted image definition of 70% or less. The transmitted image definition is based on JIS K 7374:2007 with an optical comb width set to 0.125 mm.

With the above configuration, the light control sheet has a transmitted image definition of 70% or less when the light control layer is in a turbid state. Therefore, when the light control layer is in a turbid state, visibility of a subject behind the light control sheet can be lowered.

A light control device for solving the above issues includes a light control sheet. The light control sheet includes a light control layer and two transparent electrode layers sandwiching the light control layer. The light control layer can be switched between at least a first state and a second state by changing the alignment of liquid crystal molecules by application of a drive voltage. The light control layer is transparent in the first state but is turbid in the second state. The light control layer is in the second state when there is no application of the drive voltage. The light control sheet has a clarity of 89.1% or less when the light control layer is in the second state. The clarity is calculated from the following Formula (1):

$$100\times(I_C-I_R)/(I_C+I_R) \quad (1)$$

where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

A light control device for solving the above issues includes a light control sheet and a drive circuit. The light control sheet includes a light control layer that can be switched between at least a first state and a second state by changing the alignment of liquid crystal molecules by application of a drive voltage, two alignment layers sandwiching the light control layer, and two transparent electrode layers sandwiching the two alignment layers. The drive circuit switches a state thereof between a drive-voltage-application state and a drive-voltage-absent state. The light control layer is transparent in the first state but is turbid in the second state. The light control layer is in the second state when the drive voltage is being applied. When bringing the light control layer into the second state, the drive circuit applies the drive voltage between the transparent electrode layers so that the light control sheet has a clarity of 89.1% or less. The clarity is calculated from the above Formula (1), where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

With the above configuration, the light control sheet has a clarity of 89.1% or less when the light control layer is in a turbid state. Therefore, when the light control layer is in a turbid state, visibility of a subject behind the light control sheet can be lowered.

In a management method for a light control device for solving the above issues, the light control device includes a light control sheet. The light control sheet includes a light control layer and two transparent electrode layers sandwiching the light control layer. The light control layer can be switched between at least a first state and a second state by changing the alignment of liquid crystal molecules by application of a drive voltage. The light control layer is transparent in the first state but is turbid in the second state. The method includes determining whether the light control layer is functioning normally. Determining whether the light control layer is functioning normally includes determining whether the light control sheet has a transmitted image definition of 70% or less when the light control layer is in the second state, and determining whether the light control layer is functioning normally when the light control sheet has a transmitted image definition of 70% or less and the light control layer is in the second state. The transmitted image definition is based on JIS K 7374:2007 with an optical comb width set to 0.125 mm.

In a management method for a light control device for solving the above issues, the light control device includes a light control sheet. The light control sheet includes a light control layer and two transparent electrode layers sandwiching the light control layer. The light control layer can be switched between at least a first state and a second state by changing the alignment of liquid crystal molecules by application of a drive voltage. The light control layer is transparent in the first state but is turbid in the second state. The method includes determining whether the light control layer is functioning normally. Determining whether the light control layer is functioning normally includes determining whether the light control sheet has a clarity of 89.1% or less when the light control layer is in the second state, and determining whether the light control layer is functioning normally when the light control sheet has a clarity of 89.1% or less and the light control layer is in the second state. The clarity is calculated from the above Formula (1), where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

According to the management method set forth above, the light control sheet has a transmitted image definition of 70% or less or a clarity of 89.1% or less when the light control layer is in a turbid state. Therefore, there can be provided a light control device enabling lowering of visibility of a subject behind the light control sheet when the light control layer is in a turbid state, in the stage of producing or using the light control device.

A production method for a light control device for solving the above issues includes the management method for a light control device set forth above, and measuring the transmitted image definition of the light control sheet.

A production method for a light control device for solving the above issues includes the management method for a light control device set forth above; and measuring the clarity of the light control sheet.

Obviously, numerous modifications and variations of the present invention are possible in light of the above teachings. It is therefore to be understood that within the scope of the appended claims, the invention may be practiced otherwise than as specifically described herein.

What is claimed is:

1. A light control device, comprising:
    a light control sheet comprising a light control layer and a plurality of transparent electrode layers sandwiching the light control layer such that the light control layer includes liquid crystal molecules and is configured to change alignment of the liquid crystal molecules by application of a drive voltage; and
    a controller comprising circuitry configured to control opacity of the light control sheet with multiple levels of gradation by using information for converting each different value of transmitted image definition into a value of the drive voltage,
    wherein the light control layer is configured to switch between at least transparent in a first state when the drive voltage is applied and turbid in a second state when the drive voltage is not applied such that the light control sheet has a transmitted image definition of 70% or less in the second state, where the transmitted image definition is based on JIS K 7374:2007 with an optical comb width set to 0.125 mm.

2. The light control device according to claim 1, wherein the light control sheet has a haze of 95% or more in the second state according to JIS K 7136:2000.

3. The light control device according to claim 2, wherein the transmitted image definition of the light control sheet is 60.5% or less in the second state.

4. The light control device according to claim 2, wherein the transmitted image definition of the light control sheet is 50.6% or less in the second state.

5. The light control device according to claim 1, wherein the transmitted image definition of the light control sheet is 60.5% or less in the second state.

6. The light control device according to claim 1, wherein the transmitted image definition of the light control sheet is 50.6% or less in the second state.

7. A light control device, comprising:
a light control sheet comprising a light control layer, a plurality of alignment layers sandwiching the light control layer, and a plurality of transparent electrode layers sandwiching the alignment layers such that the light control layer includes liquid crystal molecules and is configured to change alignment of the liquid crystal molecules by application of a drive voltage;
a drive circuit configured to apply the drive voltage between the transparent electrode layers and switch an application state of the drive voltage to the light control sheet between a drive-voltage-application state and a drive-voltage-absent state; and
a controller comprising circuitry configured to change opacity of the light control sheet with multiple levels of gradation by using information for converting each different value of transmitted image definition into a value of a voltage to be applied between the transparent electrode layers,
wherein the light control layer is configured to switch between at least transparent in a first state when the drive voltage is not applied and turbid in a second state when the drive voltage is applied such that the light control sheet has a transmitted image definition of 70% or less in the second state, where the transmitted image definition is based on JIS K 7374:2007 with an optical comb width set to 0.125 mm.

8. The light control device according to claim 7, wherein the light control sheet has a haze of 95% or more in the second state according to JIS K 7136:2000.

9. The light control device according to claim 8, wherein the transmitted image definition of the light control sheet is 60.5% or less in the second state.

10. The light control device according to claim 8, wherein the transmitted image definition of the light control sheet is 50.6% or less in the second state.

11. The light control device according to claim 7, wherein the transmitted image definition of the light control sheet is 60.5% or less in the second state.

12. The light control device according to claim 7, wherein the transmitted image definition of the light control sheet is 50.6% or less in the second state.

13. A light control device, comprising:
a light control sheet including a light control layer and a plurality of transparent electrode layers sandwiching the light control layer such that the light control layer includes liquid crystal molecules and is configured to change alignment of the liquid crystal molecules by application of a drive voltage; and
a controller comprising circuitry configured to change opacity of the light control sheet with multiple levels of gradation by using information for converting each different value of clarity into a value of the drive voltage,
wherein the light control layer is configured to switch between at least transparent in a first state when the drive voltage is applied and turbid in a second state when the drive voltage is not applied such that the light control sheet has a clarity of 89.1% or less in the second state, when the clarity is calculated by Formula (1), $100 \times (I_C - I_R)/(I_C + I_R)$ where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

14. The light control device according to claim 13, wherein the clarity of the light control sheet is 82.9% or less in the second state.

15. The light control device according to claim 13, wherein the clarity of the light control sheet is 72.7% or less in the second state.

16. The light control device according to claim 13, wherein the light control sheet has a haze of 95% or more in the second state according to JIS K 7136:2000.

17. The light control device according to claim 16, wherein the clarity of the light control sheet is 82.9% or less in the second state.

18. The light control device according to claim 16, wherein the clarity of the light control sheet is 72.7% or less in the second state.

19. A light control device, comprising:
a light control sheet comprising a light control layer, a plurality of alignment layers sandwiching the light control layers, and a plurality of transparent electrode layers sandwiching the alignment layers such that the light control layer includes liquid crystal molecules and is configured to change alignment of the liquid crystal molecules by application of a drive voltage;
a drive circuit configured to apply the drive voltage between the transparent electrode layers and switch an application state of the drive voltage to the light control sheet between a drive-voltage-application state and a drive-voltage-absent state; and
a controller comprising circuitry configured to change opacity of the light control sheet with multiple levels of gradation by using information for converting each different value of clarity into a value of a voltage to be applied between the transparent electrode layers,
wherein the light control layer is configured to switch between at least transparent in a first state when the drive voltage is not applied and turbid in a second state when the drive voltage is applied such that the light control sheet has a clarity of 89.1% or less in the second state, when the clarity is calculated by Formula (1), $100 \times (I_C - I_R)/(I_C + I_R)$ where $I_C$ is an intensity of straight light along an optical axis of parallel light entering the light control sheet in light passing through the light control sheet, and $I_R$ is an intensity of narrow-angle scattered light having an angle within ±2.5° relative to the optical axis of the parallel light.

20. The light control device according to claim 19, wherein the clarity of the light control sheet is 82.9% or less in the second state.

* * * * *